US008286975B2

(12) United States Patent
Gervais

(10) Patent No.: US 8,286,975 B2
(45) Date of Patent: Oct. 16, 2012

(54) BABY EVACUATION DEVICE

(76) Inventor: Douglas Damasse Gervais, Ottawa (CA)

(*) Notice: Subject to any disclaimer, the term of this patent is extended or adjusted under 35 U.S.C. 154(b) by 121 days.

(21) Appl. No.: 12/776,000

(22) Filed: May 7, 2010

(65) Prior Publication Data

US 2011/0115173 A1 May 19, 2011

(51) Int. Cl.
*B62B 5/02* (2006.01)

(52) U.S. Cl. ........................................... 280/5.22; 180/9

(58) Field of Classification Search ................. 280/5.22; 180/9, 9.1, 9.22, 9.52
See application file for complete search history.

(56) References Cited

U.S. PATENT DOCUMENTS 1,105,379 A * 7/1914 Schulze ....................... 280/5.22
4,047,724 A * 9/1977 Shaffer ....................... 280/5.22
4,062,418 A * 12/1977 Misawa ......................... 180/8.2
5,797,606 A * 8/1998 Misawa ....................... 280/5.22
6,095,531 A * 8/2000 Khachatoorian ............ 280/5.22
7,125,022 B2 * 10/2006 Medina ........................ 280/5.22
7,520,347 B2 * 4/2009 Chambliss et al. ............ 180/8.2

* cited by examiner

*Primary Examiner* — Tashiana Adams

(57) ABSTRACT

The invention provides an evacuation device for one operator, with a plurality of babies secured in pockets, having their heads secured in adjustable cushioned head rests which are attached to a patient support membrane, to descend a stairwell safely and quickly during an emergency. The invention is constructed of a tubular frame, covered with a fire-retardant, water impermeable and mold and fungus resistant material. The invention incorporates a set of casters for transport across a horizontal plane, such as crowded hallways and small hospital stairwell landings. The dual track system permits the operator to glide down the stairs in a safe, smooth and controlled fashion. The dual braking device on the track system assists the operator in a stairwell descent and permits the operator to release the chair and remove any debris that may be in the path of evacuation.

17 Claims, 6 Drawing Sheets

BABY EVACUATION DEVICE

BACKGROUND OF THE INVENTION

During the course of attending and exhibiting at several industrial and hospital-related trade-shows with an adult evacuation chair, it was brought to our attention that there was a need for a similar apparatus for babies in a health care environment. In an emergency such as a fire, elevators can not be used. Today, modern hospitals are usually constructed with multiple floors. The challenge is to transport infants as quickly as possible from a dangerous environment to a safe environment. Most of the time, this process involves transporting the infants down stairs. Since the ratio of staff to babies is quite low, this does not permit for the safe evacuation of multiple babies by one staff member alone. It also raises the question of re-entering the building to evacuate additional babies. This poses additional problems for the babies who have already been evacuated as they can not be left unattended.

The existing products are old and outdated (FIG. 5 "EVACU-5" which is not patented and "WEE VAC" FIG. 6 which has a patent number (CA 1276053). These devices provide inadequate solutions to meet the existing market demand. The existing products could cause injury to the babies during their evacuation.

With the EVACU-5, a nurse wears an apron device with pockets at the front and rear. Not only are the infants at risk of being kicked or bounced around as the nurse walks quickly across the ward floor toward the stairs, but there will be considerable rocking as the nurse descends the stairwell. Additionally, the nurse's line of sight is limited to the infants in the front pockets. The nurse has no visual contact and therefore no way of ensuring that the infants in the pockets behind her are safe. Furthermore, the EVACU-5 requires the assistance of a second nurse to place the infants in the rear pockets—something that is not guaranteed during an emergency. The nurse then has limited options in terms of what to do with the infants once he/she reaches the safe area. If the nurse needs to be transported, she can neither sit, nor remove the apron without posing serious risk to the infants.

The WEEVAC device has several advantages over the EVACU-5, but there is still no guarantee that two nurses will be available to carry six infants on a stretcher out to safety. This method requires an increased patient to nurse ratio. This reduces the number of infants that can be evacuated safely during an emergency. Similar to the EVACU-5, there is still the problem of what the nurse is to do with the infants when they arrive at the safe area. The only options are to either place the stretcher on the cold wet concrete, or have two nurses stand around holding the stretcher off of the ground.

After researching the existing products available on the market and reviewing their safety and operational functionality, it was determined that we could design a more efficient product. By incorporating and improving on the existing design features from adult evacuation devices, we designed a new and improved product to be used in the safe and rapid evacuation of babies from multi story building.

SUMMARY

The "Infant evacuation device " will hereafter be referenced as the "device". The device is used in the evacuation of up to six infants or small children from hospitals or similar environments during times of an emergency, such as during fires or earth quakes. The device is comprised of a patient support membrane made of flexible fire retardant and mildew resistant fabric, on which a plurality of pockets, all opening in the same direction, are affixed and mounted to a tubular main frame. Sufficient space is provided between the top of the membrane and the top handle of the main frame to permit the operator to see the next step on the stairs as they descend. A tether strap across each pocket permits the securing of each baby in their independent sub-pockets. The two interior common walls of the pockets come affixed to a loop and hook strap at the top edge, permitting the operator to quickly tear away the interior wall or walls to increase the pocket size considerably. Each sub-pocket has a portion cut out in the bottom to permit liquid to escape or drain more efficiently when cleaning is required. A collapsible rail assembly, also connected to the main frame, is comprised of two laterally spaced tracks with sliding endless belts, used to support the device as it glides down the stairs. There is a reverse braking device on the track system to assist the operator in a stairwell descent and permit the operator to release the brake handle on the device, (permitting the device to stop on the descent) and remove any debris that may be in the path of evacuation. Attached to the front of the main frame is a set of caster wheels to help a single user manipulate the device quickly and efficiently over a horizontal plane particularly the restricted area of a stairwell landing. The main frame is comprised of two separate U-shaped tubular sections which have a unique design feature at the bottom to accommodate the castors. The casters only engage the horizontal plane when the device is lifted by the operator. The top of the frame also has a unique design permitting the operator to see through an empty space between the bar grip and the top of the patient support membrane as he/she descends the stairs, to ensure that no unseen obstruction will cause the operator to stumble. The babies are placed into each pocket so that their heads are secured with the unique, adjustable U-shaped cushioned head rests and are secured for transport. With the chair's ability to turn 360 degrees to manipulate crowded halls and stairwell landings, the headrest adds sufficient safety for the infants. Once removed from the wall bracket and placed on the floor, the operator grips the top handle of the main frame while the lower end with the casters rests on the floor. The operator then lifts the chair up to their waist and with a sharp jerk down, deploys the rail system with the aid of gravity. The device is now ready to have infants placed inside.

The frame is uniquely designed to provide gripping bars at both ends to allow two operators to carry the device up stairs if required. Ropes can be attached to the frame in order to lower the device from a window should other exits be blocked or unsafe. Once outside the building the device can be wheeled to a safe area or loaded into a vehicle intact, for transport. The babies are safe and can be monitored at all times while remaining in the device until permission is granted to re-enter the building or until they are moved to another premise.

BRIEF DESCRIPTION

For a better understanding of the invention's features, a detailed description follows. The description is understood by referring to the following figures.

Figure 4A:
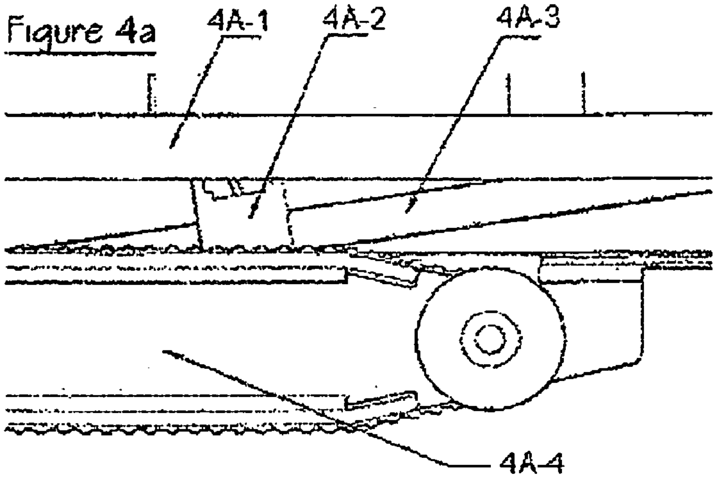

FIG. 4*a* is the support rail for the tracking system.

Figure 4B:
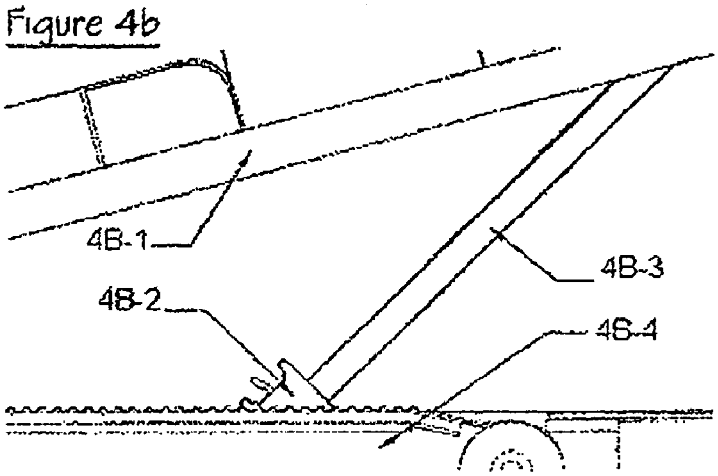

FIG. 4*b* is an exploded view of the one way locking device.

Figure 5:
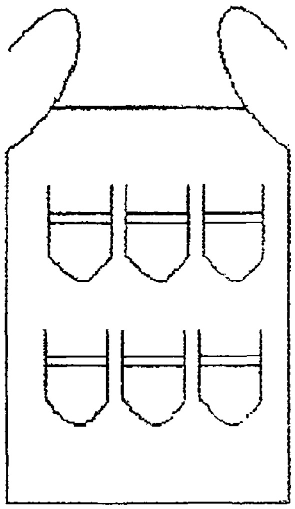

FIG. 5 shows a prior art apron for holding babies.

Figure 6:
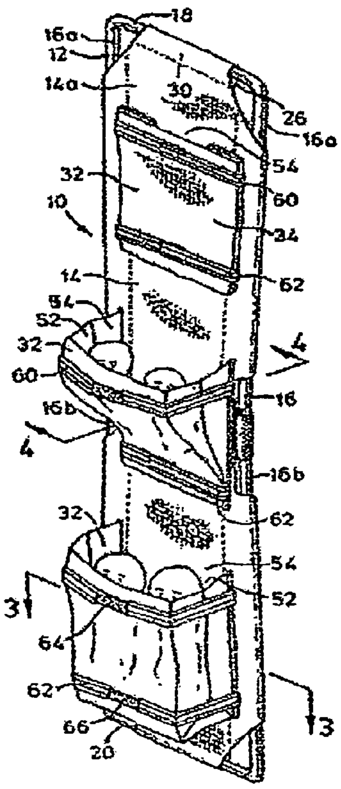

FIG. 6 shows a prior art baby stretcher.

DETAILED DESCRIPTION

Figure 1:
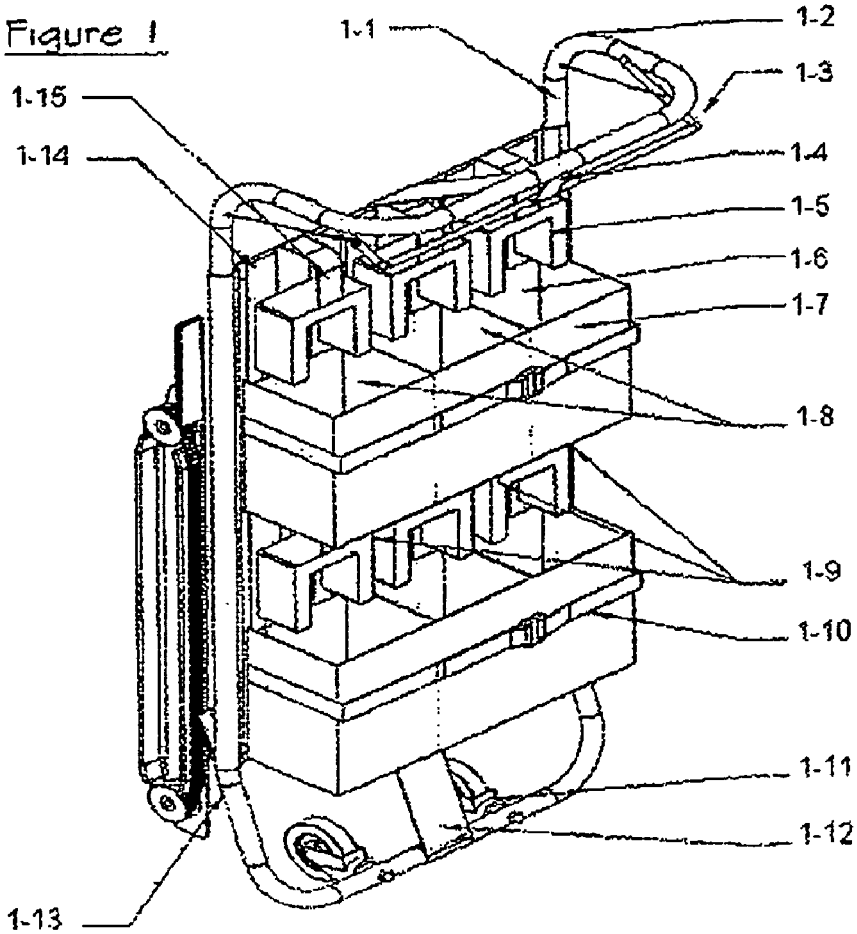
FIG. 1 is a main overview of device

The main tubular frame (1-1) is the main support system. The tubular frame is one solid entity that requires no assembly. There are unique bends (FIG. 1-2), at the top end (operator end) to allow the operator to walk with the device at arms length and descend the stairs safely, viewing the steps as they descend. The reverse brake handle (1-3) is disengaged when the operator squeezes the handle to the main frame. Only when the operator releases the handle will the brake under pressure make contact with the track and stop the descent of the device. There is a nylon strap (1-4) which holds the brake bar a comfortable gripping distance away from the main frame handle.

The six infant head-rests consist of several parts. The main portion of the headrest is the custom adjustable U-shaped head rest (1-5), with the loop and hook system stitched to the bottom. A pair of loop and hook system straps (1-14) is attached to the main body if the patient support membrane (1-6). At the back of the U-shaped headrest (1-5) is tethered a nylon strap (1-15), of several inches, which has the opposite end attached to the main body of the patient support membrane (1-6). With these four features the operator can quickly tear away the headrest, slide the infant into a pocket, re-position the headrest around the infants head and secure the headrest to the loop & hook system (1-14). The loop & hook system straps (1-14) are of sufficient length so that the operator can make adjustments to accommodate for any size of infant head. The two large pockets (1-7) (one per row). The two interior pocket walls (1-8) divide the two larger pockets into 6 individual sub-pockets. These sub-pockets are designed in such a way that they are stitched on the bottom to the patient support membrane and have the upper edge finished with a strip of loop & hook system. This design provides the operator with the ability to tear away the interior wall or walls to accommodate for larger babies or an increased number of babies in the case of extreme over-crowding on the ward. As a maintenance feature, there is a half-moon shape cut out of the bottom of each sub-pocket (1-9), in order to allow liquid to drain out if the device was soiled during an evacuation and required cleaning. Once the infants are placed inside the sub-pockets, a nylon belt (1-10) is drawn snug across each large pocket. The belt is then secured by the loop & hook system, that is stitched at the end of the belt to the appropriate position on the surface of the belt.

The bottom end of the main frame (1-13) has a specific angle incorporated into it, that permits the casters (1-12) device, thereby ensuring that the casters are positioned at the correct angle to facilitate the quick and smooth movement of the chair across a horizontal surface. To maintain a taunt surface on the overall patient support membrane (1-6), a large nylon strap is stitched to the patient support membrane and secured to the operator end of the main frame, as well as the bottom end with a loop and hook system.

Figure 2:
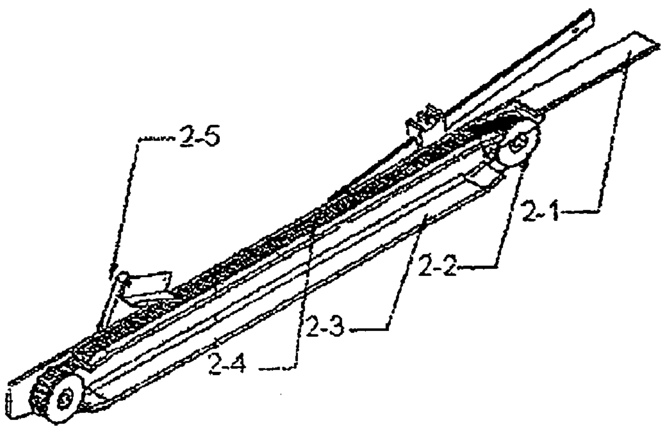
FIG. 2 is a side view of the tracking system.

The device's main frame is attached to a track system, as shown in FIG. 2. The track system is comprised of two laterally spaced tracks (2-3), with sliding endless grooved belts, (2-4), and two nylon pulleys (2-2), which assist in the rotation of the belts. Also attached to the end of the track is a handle (2-1), which is used by the operator as they lift the device down from the wall bracket.

Figure 3:
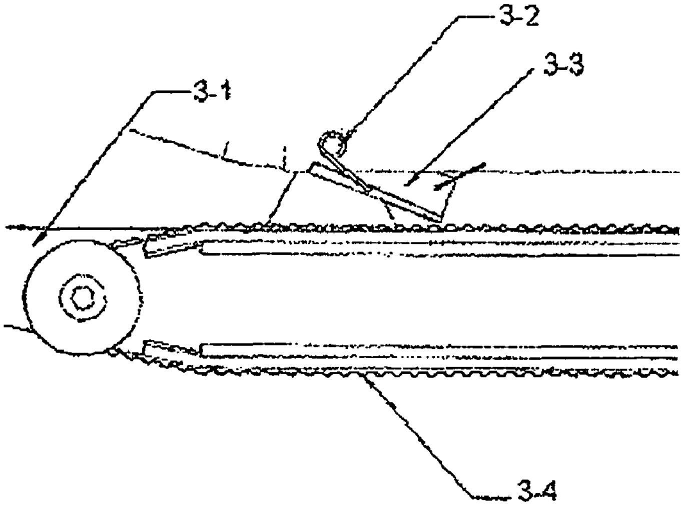
FIG. 3 is the reverse braking system.

Two other unique features of the device are the reverse braking system, as shown in FIG. 3, and the collapsible rail assembly, as seen in FIGS. 4*a*-4*b*.

As previously described, the reverse brake handle (1-3), is disengaged when the operator has squeezed the handle to the main frame. Only when the operator releases the handle will the brake under pressure (3-2, 3-3) make contact with the grooves in the track (3-4) and stop the descent of the chair. The use of a coiled steel spring, (3-2), forces the brake plate (3-3) to continuously apply adequate pressure to the belt (3-4) to restrict the forward movement of the rail system and device at any given point during a stairway descent.

In an emergency each process or lack of processes is important to minimize the total evacuation time. The collapsible rail assembly is illustrated in FIG. 4*a*. The one-way locking mechanism is illustrated in FIG. 4*a*. There is a toothed bar (4*a*-3), which will only slide and lock in one direction as it travels through the one-way locking mechanism (4*a*-2). This permits the operator to lift the device up to their waist and with a sharp jerk down, deploy the rail system with the aid of gravity. The device is now ready for infants to be placed inside.

The embodiments of the present invention in which an exclusive property or privilege is claimed are defined as follows:

1. A baby evacuation device for a plurality of babies comprised of a frame connected to a track with a continuous belt, whereas the frame is affixed to a patient support membrane is at least a pocket of a plurality of pockets, whereby each pocket can accommodate a plurality of babies, having an open end and sharing a common orientation to permit the secure babies in the pockets to be at least parallel to the incline of the stairs during an evacuation, wherein each pocket comprises a plurality of individual compartments having an open end oriented towards the top end of the device frame, a bottom panel and two parallel side panels to complete the box shape of the pocket, has a half-circle hole at their base to allow dust, dirt and waste to escape easily during cleaning, where the rear edges of the two interior longitudinal walls of the individual compartments are stitched to the patient support membrane, while the opposing upper edges are affixed with a hook and loop system running from the pockets top to bottom to closely confine and isolate babies located therein to the individual compartments, and the interior upper walls may easily be torn loose from the pocket and laid flat inside the pocket thereby creating a larger pocket.

2. The pockets as described in claim 1 wherein a nylon strap, runs across the top of said pockets and is secured at each of the opposing edges where the patient support membrane meets the main frame, furthermore, in the nylon strap there exists a buckle permitting the strap to be pulled taunt and secured along the path of the strap with a hook and loop system, therein providing a means to adjust the size of the pockets.

3. The patient support membrane as describe in claim 1, has two parallel hook and loop straps stitched longitudinally above each of the pockets.

4. A U-shaped infant headrest with a hook and loop stitched to the bottom of the headrest is tethered to the patient support membrane above the two parallel hook and loop straps claimed in claim 3.

5. An infant headrest as claimed in claim 4 is removable and adjustable, up and down, as well as in the width, on the two parallel straps to accommodate different sizes of infant heads.

6. A frame as described in claim 1 wherein a top end of the frame acts as a gripping bar to be held by an individual in order to carry the device up stairs, be pushed down stairs or be pushed forwards, backwards or side ways along a horizontal plane.

7. A frame as described in claim 1 wherein a top end of the frame has a reverse brake handle bar incorporated into the upper frame in an appropriate position so as to accommodate the operator in gripping the bar while operating the device.

8. A baby evacuation device as described in claim 1, wherein sufficient distance is left between the frame and the patient support membrane to provide a clear view for the operator as they descend stairs.

9. A baby evacuation device as described in claim 1 wherein the membrane has a nylon strap stitched underneath that runs longitudinally from top to bottom and extends past the membrane with a significant length so as to wrap around each end of the frame, wherein a hook and loop system is stitched to the exposed ends, which are drawn taunt and secured.

10. A baby evacuation device as described in claim 1, wherein connected to the frame by a longitudinal rigid channel member frame with two pulleys mounted upon horizontal axes positioned at the opposite ends of the frames, and belts extending around those pulleys therefore forming two longitudinal runs between the pulleys allowing the belt to spin, each continuous belt assembly comprised of strong, high friction material is used to support the device for movement down stairs by gripping said stairs.

11. A baby evacuation device according to claim 10, wherein a handle is attached to the rigid channel member frame behind the pulley to provide a gripping position for the operator to remove the device from the a bracket.

12. A baby evacuation device according to claim 10, wherein affixed near a front end of the frame is a spring load reverse braking plate system.

13. A baby evacuation device according to claim 7, incorporating a reverse braking system which is disengaged when the braking bar is held against the upper frame, wherein the braking bar is released the braking plate will engage the grooved track and halt the forward motion of the device.

14. A collapsible rail assembly according to one of claims 1 or 10, comprised of dual parallel sliding toothed locking mechanism, secured at one end to the near rear longitudinal rigid channel member frame, and the opposite end secured to the main frame, therein permitting the patient support membrane to travel freely and lock in the open upright position.

15. A baby evacuation device for a plurality of babies comprised of: a frame connected to a track with a continuous belt, whereas the frame is affixed to a patient support membrane is at least one pocket of a plurality of pockets, whereby each pocket can accommodate a plurality of babies, having an open end and sharing a common orientation to permit the secure babies in the pocket, to be at least parallel to the incline of the stairs during an evacuation; and a collapsible rail assembly constructed of a dual parallel sliding toothed one way locking mechanism, secured at one end to the near rear longitudinal rigid channel member frame, and the opposite end secured to main frame, therein permitting the patient support member to travel freely in one direction and lock in the open upright position.

16. A baby evacuation device for a plurality of babies comprised of:

a frame connected to a track with a continuous belt, whereas the frame is affixed to a patient support membrane is at least one pocket of a plurality of pockets, whereby each pocket can accommodate a plurality of babies, having an open end and sharing a common orientation to permit the secure babies in the pockets to be at least parallel to the incline of the stairs during an evacuation, wherein each pocket comprises a plurality of individual compartments each having an open end oriented towards the top end of the device frame, a bottom panel and two parallel side panels to complete the box shape of the pocket, whereas each individual compartment has a half-circle hole at their base to allow dust, dirt and waste to escape easily during cleaning, and wherein a nylon strap, runs across the top of said individual compartments and is secured at each of the opposing edges where the patient support membrane meets the frame, furthermore, in the middle of the nylon strap there exists a buckle permitting the strap to be pulled taunt and secured along the path of the strap with a hook and loop system, therein providing a means to adjust the size of the pockets.

17. A collapsible rail assembly according to claim 15, incorporates a release mechanism system consisting of two parallel pull cords tethered between the main frame and locking mechanism, therein releasing the locking mechanism and permitting the collapsible rail assembly to collapsed for storage.

* * * * *